Patented Oct. 14, 1952

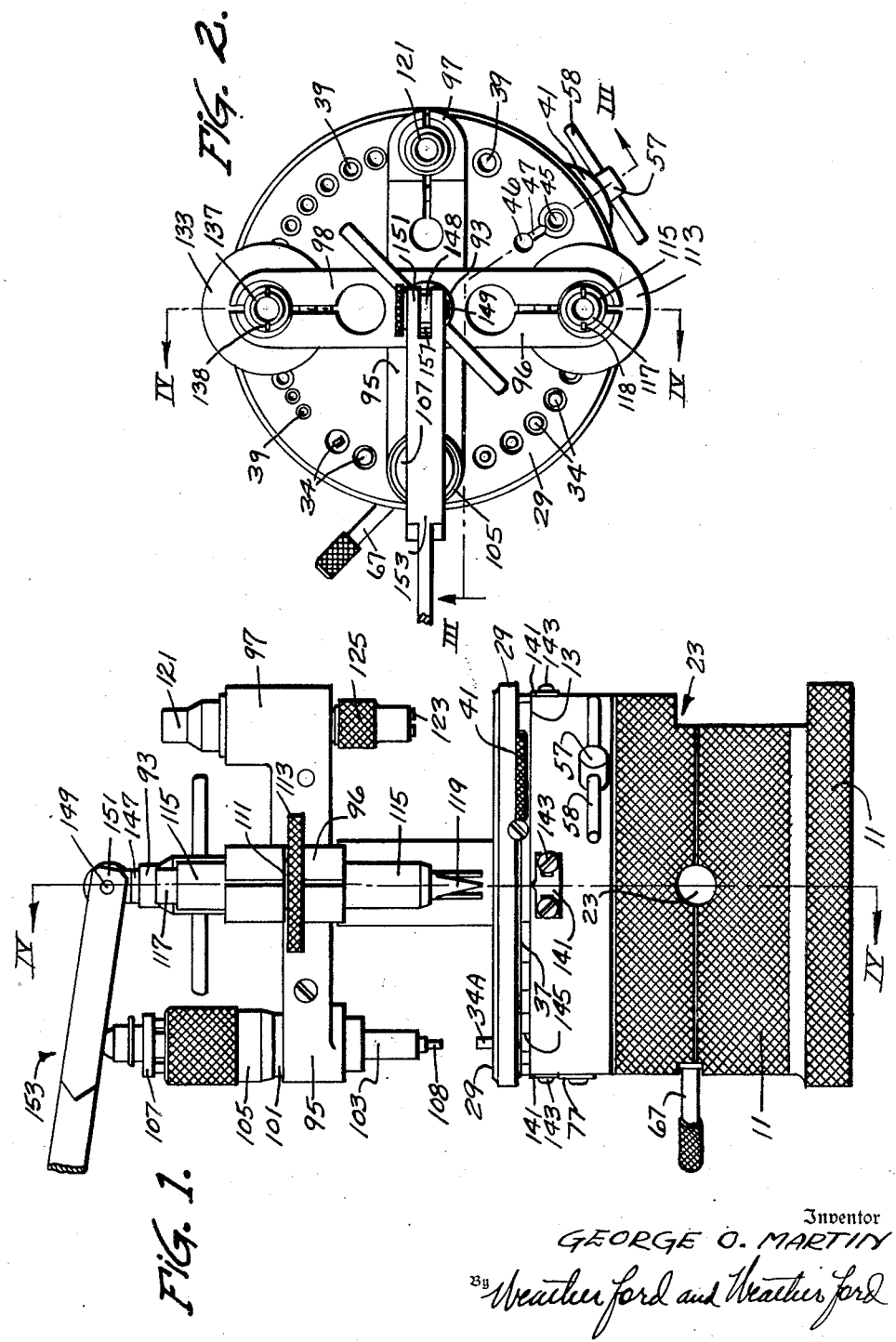

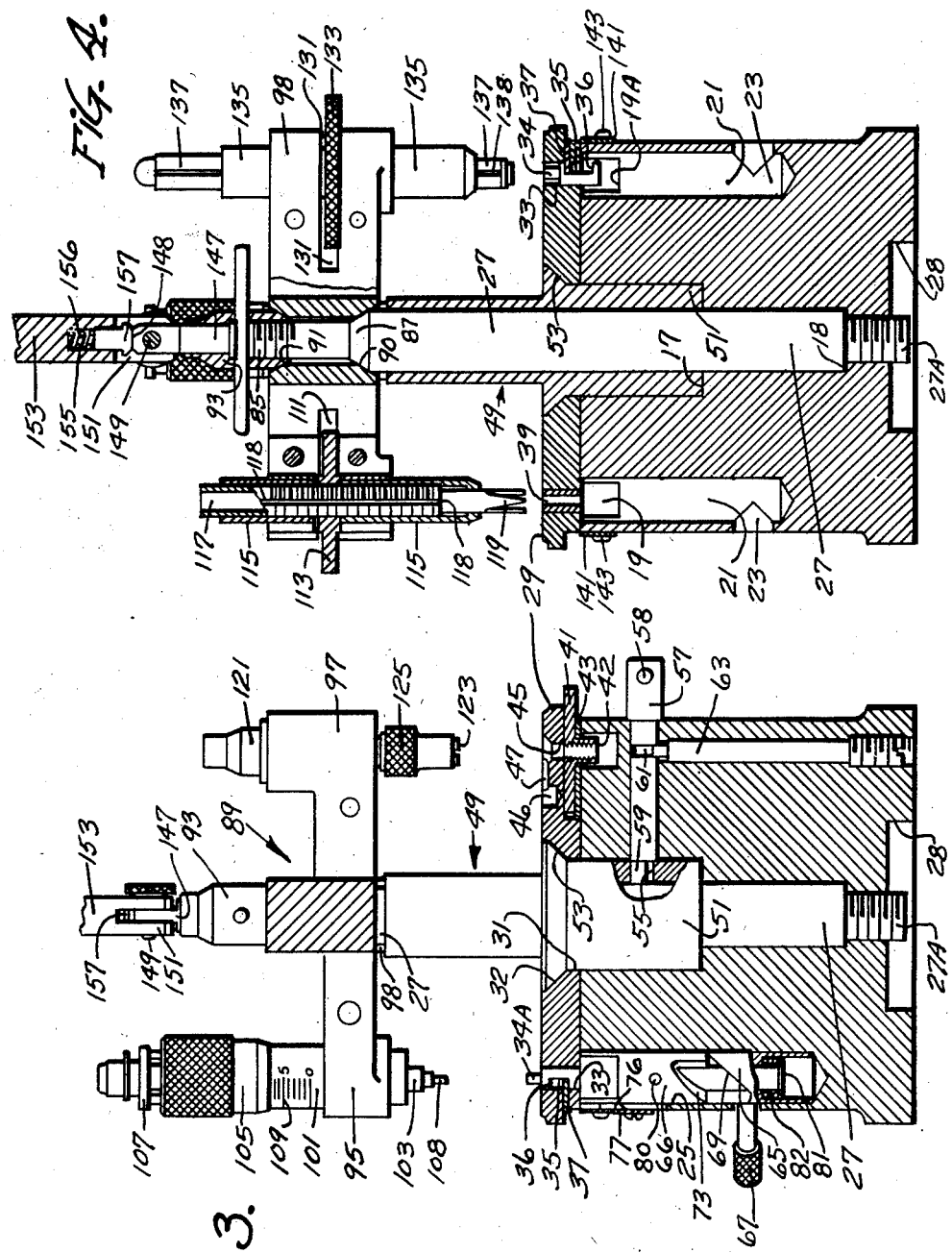

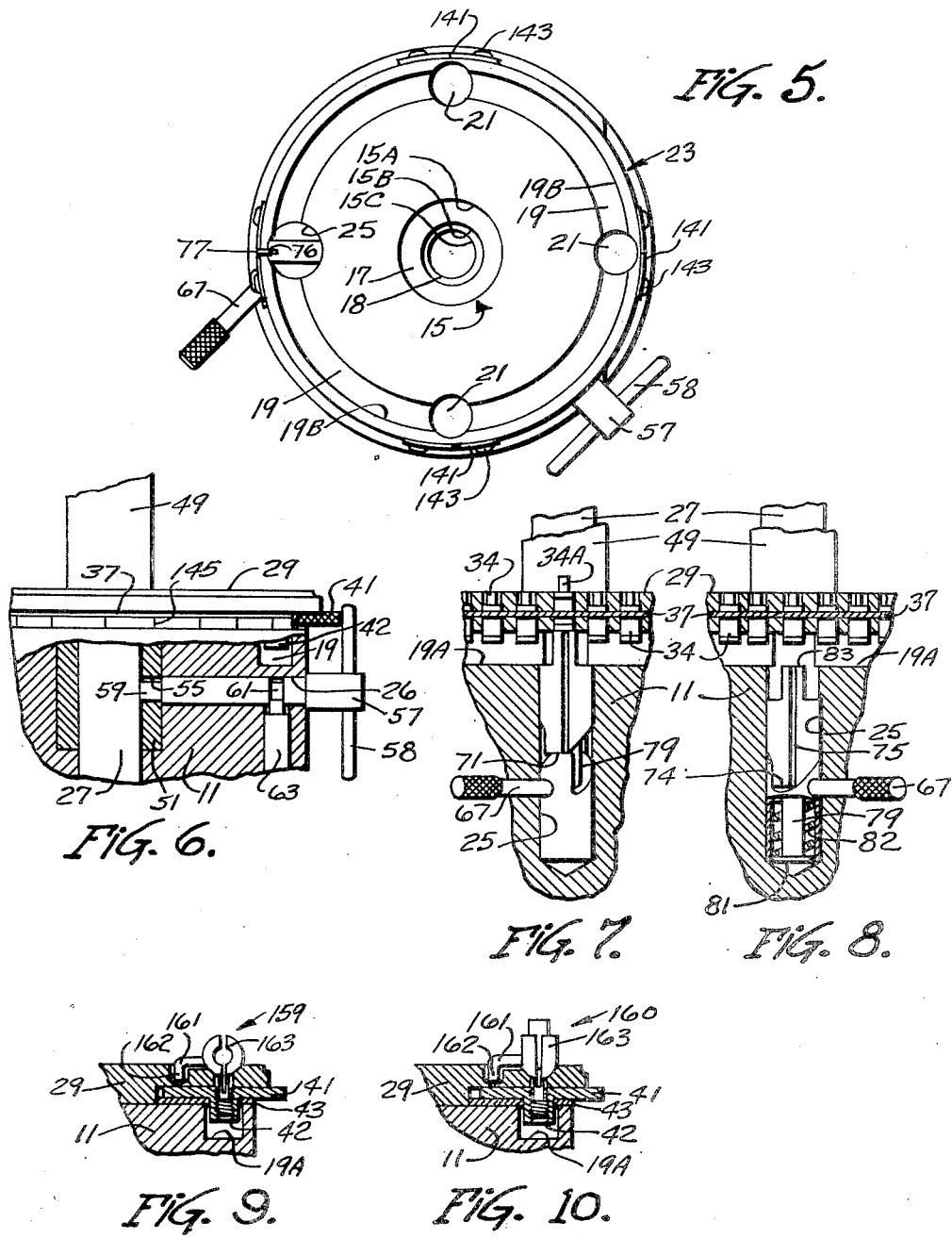

2,613,434

UNITED STATES PATENT OFFICE 2,613,434

COMBINATION STAKING TOOL

George O. Martin, Walnut Ridge, Ark.

Application November 7, 1949, Serial No. 126,014

9 Claims. (Cl. 29—231)

This invention relates to a new and novel mechanism which is particularly adapted to and useful in the art of repairing watches and other time pieces, and is further useful in work of similar nature relating to other devices under repair.

Heretofore it has been necessary for a repair man, such as a watch maker, to provide a multiplicity of instrumentalities for the purposes of effecting repairs to and replacements in the working parts of mechanisms, such as those of time pieces, and in addition to the skill required in the actual manipulation of such instrumentalities in effecting the desired repair, such repair man has found it heretofore necessary to position the various dies, punches, and anvil members by hand requiring the exercise of considerable skill and care.

The primary object of this invention is to provide a single and compact unitary combination time piece repairing assembly which will have readily available for the repair man the instrumentalities necessary for use in effecting the requisite repairs.

A further object of the invention is to provide such an instrumentality, together with means for positively and accurately positioning and maintaining the repair instrumentalities with predetermined accuracy.

A further object of the invention is to provide such an assembly which includes a tool holding head, including radially disposed tool supporting arms and a rotatable turntable positioned to lie beneath the tool holders for positioning of cooperative repair instrumentalities.

A further object of the invention is to provide such a device, together with means for locking the rotatable turntable in adjusted position.

A further object of the invention is to provide such a device in which a plurality of anvil-like watchmaker's stumps are carried by a rotatable turntable substantially flush with the upper face of such turntable, together with means for effecting elevation of individual said stumps into use position.

A further object of the invention is to provide such an assembly with a universally attached striking tool.

And a further object of the invention is to generally improve the design, operation and efficiency of watch making and repair tools.

The means by which the foregoing and other objects of the present invention are accomplished and the manner of their accomplishment will readily be understood from the following specification upon reference to the accompanying drawings, in which:

Fig. 1 is a side elevational view of the unitary device of the present invention with the handle of the striking tool broken away.

Fig. 2 is a plan view of the device shown in Fig. 1.

Fig. 3 is a sectional elevational view taken as on the line III—III of Fig. 2 with certain portions broken away for purposes of illustration.

Fig. 4 is a sectional elevational view taken on the line IV—IV of Figs. 1 and 2 with certain parts broken away for purposes of illustration.

Fig. 5 is a top plan view of the base of the device.

Fig. 6 is a fragmentary elevational view partially broken away to illustrate the operation of the turntable locking means.

Figs. 7 and 8 are fragmentary elevational views illustrating the details and operation of the stump elevating means; and Figs. 9 and 10 are fragmentary sectional views illustrating one of the auxiliary devices forming a part of the present mechanism.

Referring now to the drawings in which the various parts are indicated by numerals, the mechanism of this invention is carried by a base 11 which is preferably substantially cylindrical in shape, and has an upper horizontal face 13. The base 11 is provided with a central vertical bore 15, Fig. 5, consisting of an upper bore portion 15A which extends downwardly preferably through approximately two-fifths of the depth of the base, an intermediate bore portion which extends downwardly from the lower end of portion 15A substantially an equal distance, and a further reduced diameter lower bore portion 15C, which extends downwardly a minor distance and terminates adjacent the bottom of base 11. The bore portions are in communication to form a continuous stepped bore extending through base 11. An annular shoulder 17 forms the bottom of the upper portion 15A and surrounds the upper end of the intermediate bore portion 15C and similarly a lower annular shoulder 18 forms the bottom of intermediate bore portion 15B and surrounds the upper end of lower bore portion 15C.

Upper face 13 is annularly grooved adjacent its periphery and concentric with bore 15 to form a trackway 19, having a bottom 19A disposed below the upper surface of face 13, and an annular relatively thin upstanding side wall 19B surrounding the trackway, the upper edge of side wall 19B being flush with face 13.

Communicating with trackway bottom 19A are vertical gravity discharge passageways 21, which are preferably of circular cross section and extend downwardly through a substantial portion of the thickness of base 11 to terminate in suitable access openings 23, Fig. 1. Preferably two of the vertical passages 21 are positioned on diametrically opposite sides of base 11 and another vertical passage 21 is disposed ninety degrees from each of the first two passages mentioned so as to lie equidistant therefrom. Diametrically opposite the latter vertical passageway 21 a vertical guideway 25 is formed in base 11 communicating also with trackway 19. Intermediate two of the vertical passages 21 a horizontal tunnel 26 (Fig. 6) is formed in base 11, which is of circular cross section and extends from the side wall of the base into communication with upper bore portion 15A.

Mounted in central bore 15 is an elongated vertical post 27, the body of the post being of a size to closely and slidably fit intermediate bore portion 15B, the post terminating in a lower reduced portion 27A which is externally threaded, lower bore portion 15C being internally threaded to receive and engage lower post portion 27A to retain the post mounted in bore 15. Base 11 may be recessed as at 28 to provide access to the lower post portion 27A from beneath the base and a lock nut (not shown) may be added to engage post portion 27A within recess 28 and lock the post in mounted position if desired.

Seated on upper face 13 of base 11 is a rotatable turntable 29 which is provided with a central aperture 31, the upper portion of the aperture being enlarged preferably by beveling as at 32. The lower portion of the aperture is of a diameter substantially equal to the diameter of upper bore portion 15A. Turntable 29 overlies and covers upper face 13, turnably seating on the upper face and upon the upper edge of trackway wall 19B.

A plurality of vertical apertures 33 (Fig. 4) are formed to extend through turntable 29, apertures 33 being arranged in an arcuate band overlying and concentric with trackway 19 and extending around a substantial portion of turntable 29. A like plurality of anvil-like stumps 34, provided on their respective tops with faces of varying sizes and shapes convenient for use in connection with many of the steps necessary in watch repair are reciprocably mounted in apertures 33. The stumps are normally retracted with the top faces of the stumps lying substantially flush with the upper face of turntable 29. Stumps 34 normally depend below the lower face of turntable 29 and are positioned to lie within trackway 19 with their lower ends spaced slightly above trackway bottom 19A. In this manner the trackway is enabled to house the stumps in retracted position and to prevent interference by the stumps with rotation of the turntable. Each of the stumps is cut away intermediate its length as at 35 to provide upper and lower outwardly projecting shoulders 36.

Turntable 29 is provided with an elongated retaining member 37 (Fig. 3) which preferably consists of a substantially flat member positioned in a suitable slot formed in the edge of turntable 29 between the upper and lower faces thereof, the slot extending into and intersecting the stump carrying apertures 33 so as to lie between the upper and lower shoulders 36 of the respective stumps and to be effective as a stop limiting reciprocal movement of stumps 34, so as to prevent accidental displacement of the stumps from the turntable and to prevent over-travel of the stumps beyond desired use position upon elevation thereof.

Turntable 29 along an additional arcuate band, also concentric with and overlying trackway 19, is provided with a plurality of apertures, in each of which a die 39 is mounted, preferably removably. The dies 39 are arranged with their centers on an arc formed concentrically with turntable aperture 31 and trackway 19. Preferably dies 39 are of varying size so as to provide a plurality of dies, which, as indicated in Fig. 2, are arranged in graduation from largest to smallest along the arc in which they lie.

The lower face of the turntable 29 is recessed adjacent one end of retainer 37 to house a rotatable screw wheel 41 having a downwardly projecting hub 42 which is journalled in a plate 43, plate 43 being rigidly attached to turntable 29 and lying substantially flush with the lower face of the turntable 29 and supporting screw wheel 41 with a portion of the edge of screw wheel 41 projecting outwardly beyond the periphery of turntable 29. Hub 42 and screw wheel 41 are centrally apertured, the apertures being in register with an aperture 45 extending through the upper face of turntable 29. Hub 42 is internally threaded and is adapted to receive and engage externally threaded members as hereinafter pointed out. Adjacent and radially alined with aperture 45 is a small recess 46, the recess 46 and aperture 45 being connected by a shallow groove 47.

Slidably surrounding post 27 is an elongated collar 49, the inner diameter of which is such as to closely and slidably fit the body of post 27. The lower portion 51 of collar 49 is preferably of larger diameter than the upper portion thereof, lower collar portion 51 closely fitting within upper bore portion 15A and the lower portion of turntable aperture 31. Collar 49 is further provided with an intermediate enlarged portion, as for example bevel 53, which is adapted to overlie and seat against turntable bevel 32. The lower end of collar 49, when the collar is positioned surrounding post 27, is seated on annular shoulder 17 of bore 15. Collar portion 51 is further provided with an aperture 55 having a diameter less than the diameter of tunnel 26 positioned in communication but out of axial alinement with tunnel 26, the upper portion of aperture 55 being preferably normally alined with the upper portion of tunnel 26.

Positioned in tunnel 26 is the cylindrical barrel of a rotatable lock pin 57, which is of a size to closely and rotatably fit in tunnel 26. Pin 57 exterior base 11 is provided with a suitable handle 58, and at its inner end pin 57 is provided with an end portion 59 which is of a diameter less than the diameter of pin 57 and also less than the diameter of collar aperture 55. End portion 59 projects inwardly from the inner end of pin 57, is positioned out of axial alinement with the barrel of pin 57 and extends into collar aperture 55, being positioned eccentrically of the aperture. The barrel of pin 57 is provided with an annular groove 61 which is engaged by the upper end of an elongated retainer member 63, which retaining member conveniently extends from the bottom of base 11 upwardly into engagement with groove 61. The engagement of the groove by the retaining member permits rotation of pin 57 about its longitudinal axis while limiting horizontal movement of the pin. It will be observed that when pin 57 and eccentric end portion 59 are in the position illustrated in Fig. 3, the end portion extends into the interior of collar aperture 55, in contact with the upper portion of aperture 55 limiting vertical movement of collar 49, so as to retain the collar and turntable 29 against removal from the unit. It will further be seen that a limited vertical movement of the collar may be accomplished due to the difference between the diameter of aperture 55 and of end portion 59, this slight freedom of movement permitting turntable 29 to rotate freely around collar portion 51 and collar bevel 53. Upon rotation of pin 57 about its longitudinal axis eccentric end portion 59 is moved to the position shown in Fig. 6, in which the eccentric portion has been moved downwardly away from the upper portion of aperture 55 and into engagement with a lower portion of the interior of aperture 55. This latter movement effects a downward pull upon collar 51, moving bevel 53 into tight frictional engagement with turntable bevel 32, effectively clamping and locking the turntable against rotation.

Housed in and guided by guide passage 25 is the stump lift mechanism of the present invention, which consists of lower and upper substantially cylindrical cooperative cam members 65, 66. The lower end of lower cam member 65 is seated on the lower portion of passage 25, in which passage the member is turnable. Member 65 is provided with an externally projecting handle 67 removably attached thereto and projecting outwardly through a suitable opening formed in base 11. At its upper end member 65 is deeply serrated to form diametrically opposite camming surfaces 69, which camming surfaces terminate in upwardly facing, substantially horizontal cam seats 71, Fig. 7.

Upper cam member 66 is slidably mounted for vertical reciprocation in the upper portion of passage 25 and is seated at its lower end on the cam means of member 65. Upper member 66 at its lower end is deeply serrated, similarly to member 65, to provide camming surfaces 73 cooperative with camming surfaces 69, surfaces 73 terminating in downwardly facing, substantially horizontal cam seats 74. Cam surfaces 69, 73 and seats 71, 74 are formed to substantially nest, as shown in Fig. 8, and upon rotation of member 65 camming surfaces 69 act upon camming surfaces 73 to effect upward movement of upper member 66. Upper member 66 is provided along one side with a vertical groove 75 which is engaged by the inwardly projecting tongue 76 of a key member 77, Fig. 3, preferably fixed to the exterior of base 11 with tongue 76 projecting inwardly through a suitable slot formed in the side wall of base 11 and into groove 75, engaging the groove to prevent rotational movement of upper cam member 66.

Members 65, 66 are centrally bored to receive a plunger 79, by means of which the members are coupled against separation. Plunger 79 at its upper end is secured as by a pin 80 to upper member 66, and extends downwardly into member 65. At its lower end plunger 79 terminates in a head 81, positioned within member 65, member 65 being chambered to receive head 81 for reciprocal movement therein. Interposed between the upper face of head 81 and the interior of member 65 adjacent its upper end is a compression spring 82. It will be seen that when the members 65, 66 are in the positions illustrated in Fig. 8, the cam means are nested and upper member 66 is in lowered position, with spring 82 bearing against head 81 and maintaining contact between members 65, 66. When lower member 65 has been rotated by handle 67 in the nature of one hundred degrees to the position shown in Figs. 3 and 7, the cooperative interaction of camming surfaces 69, 73 effects raising of upper member 66, the upward movement of member 66 moving plunger 79 therewith and effecting compression of spring 82 by plunger head 81, the compressed spring urging downward movement of upper member 66. It will be seen that when upper member 66 has been moved to raised position the downwardly facing cam heats 74 are seated upon the upwardly facing cam seats 71 of lower member 65, and resist the action of spring 82, retaining upper cam member 66 in raised position until reverse rotation of lower member 65 is begun by use of handle 67. The upper end 83 of upper cam member 66 is substantially flush with trackway bottom 19A when member 66 is in lowered or retracted position (Fig. 8) and is raised to a point where it is substantially flush with upper base face 13 and trackway wall 19B when upper member 66 is elevated as described to the positions shown in Figs. 3 and 7. It thus will be seen that operation of cam members 65, 66 is effective to raise an individual selected stump, as stump 34, Fig. 7, when such selected stump is positioned over the cam members, upper end 83 upon raising abutting the lower end of stump 34A, moving the stump upward as member 66 is raised and solidly supporting the stump in raised position during seating engagement of cam seats 71, 74. Upon return of cam member 66 to lowered position stump support is removed and the previously raised stump is free to return by gravity to its lowered position with its lower end depending into trackway 19. Preferably upper end 83 of cam member 66 is narrowed to a width slightly in excess of the diameter of a single stump 34, in order to better insure elevation of a single stump and to reduce the possibility of undesired elevation of more than one stump for use.

Above collar 49 post 27 is provided with an externally threaded upper portion 85 (Fig. 4) which is of reduced diameter relative to the diameter of post 27 and is joined to the post by a bevel 87. Mounted on threaded portion 85 is a tool carrying head 89 having an apertured center portion, the aperture closely surrounding threaded portion 85 and terminating at its upper and lower ends in internal bevels 90, 91. Lower bevel 90 is snugly fitted against and seated on post bevel 87. Engaging threaded portion 85 is an internally threaded cap 93 which at its lower end is externally beveled as at 94, bevel 94 being tightly seated against tool head bevel 91, so that upon tightening of cap 93 on threaded portion 85, tool head 89 is rigidly locked in position against movement relative to post 27.

Tool head 89 includes radially projecting horizontal arms 95, 96, 97, 98, Fig. 2, which are equally spaced apart so that at their outer ends they respectively overlie passages 21 and guideway 25. Each arm adjacent its outer end is apertured to receive and support a vertical tool guide, respectively vertically alined with passages 21 and guideway 25.

Arm 95 at its outer end overlies guideway 25 and cam members 65, 66 housed in the guideway. Preferably mounted in the aperture of arm 95 is a barrel 101 (Figs. 1 and 3) which is internally threaded to receive and engage the exteriorly threaded portion of a hollow tube 103 rotatably and slidably mounted therein. Rigidly fixed to the tube 103 is a knurled cap 105 which is of a size to fit over the exterior of barrel 101. Superimposed on and carried by cap 105 is a resiliently mounted, centrally apertured support member 107, the aperture of support member 107 being in register with the interior of tube 103 and adapted to receive a suitable tool, such as a punch 108. Preferably barrel 101 is calibrated, as at 109, and the skirt of cap 105 may also be calibrated, these latter calibrations not being shown, the calibrations serving to accurately indicate the amount of advancement or retraction of tube 103 in barrel 101. It is believed apparent that a tool, such as punch 108, may be positioned in tube 103 with the tool head resting on support member 107 and extending below the lower end of tube 103 and the spacing of the tool from turntable 29 and a work piece mounted thereon may be accurately determined and established through the medium of the interaction of calibrated barrel 101 and threaded tube 103 upon rotation of screw cap 105.

Arm 96 is preferably horizontally slotted as at 111, an internally threaded wheel 113 being turnably mounted in slot 111. The internally threaded portion of wheel 113 is in register with the aperture formed in arm 96, in which aperture upper and lower barrel members 115 are rigidly mounted respectively above and below slot 111. Slidably mounted in barrel members 115 is an externally threaded hollow tube 117, the threads of the tube being engaged by the internal threads of wheel 113 for tube advancement or retraction responsive to wheel rotation. Preferably tube 117 is grooved as at 118 to receive a suitable retainer or key so as to limit rotational movement of the tube. At its lower end tube 117 is provided with a pronged lower foot 119 by which objects underlying arm 96 may be engaged and held upon lowering of tube 117 by the use of wheel 113. This instrumentality is particularly useful as a clamp for holding a work piece while a drill or reamer is passed through the hollow tube 117, the drill and reamer being accurately positioned relative to the work piece by the tube and being enabled to extend downwardly through the prong-like foot into working contact with the work piece.

Arm 97 extends from post 27 diametrically opposite to arm 95 and is positioned overlying one of the passages 21, with a hollow guide sleeve 121 mounted therein in alinement with the underlying passage 21. Preferably sleeve 121 below arm 97 is threaded adjacent and above its lower end, the lower end being provided with suitable chuck jaws 123, the operation of the chuck jaws being effected by a knurled collar 125 threadedly engaging the threaded portion of sleeve 121. A suitable tool, such as a punch or other tool, may be slidably mounted in sleeve 121 and resistance to vertical movement established through the medium of the chuck, the tension being adjustable so as to prevent undesired slippage of such a tool in guide sleeve 121.

The remaining arm 98 is disposed diametrically opposite arm 96, arms 96 and 98 being disposed in alinement, and arms 95 and 97 being similarly disposed in alinement, the respective longitudinal mid lines of the alined arms intersecting substantially at right angles above the center of turntable 29. Arm 98, similarly to arm 96, is slotted as at 131, in which slot an internally threaded wheel 133 is turnably mounted. Upper and lower barrel members 135 are rigidly mounted in the aperture of arm 98 respectively above and below slot 131 and are in vertical alinement with passage 21 therebelow. Reciprocably mounted in barrel members 135 is a centrally apertured tube 137 which intermediate its length is externally threaded and is engaged by the internal threads of wheel 133 for advancement or retraction of the tube responsive to wheel rotation. Tube 137 is preferably provided with a vertical groove 138 which is engaged by a suitable retaining member to prevent rotational movement of tube 137.

This instrumentality is particularly adaptable for use in connection with repair work, such as the removal of balance staffs from the balance wheels of time pieces, the lower end of tube 137 being provided with a small opening designed to closely fit over such a balance staff upon lowering of the tube, and the tube adjacent and surrounding this opening being adapted to engage the arms of the balance wheel adjacent the staff, holding them securely and eliminating the danger of damage to the balance wheel during removal of the staff by a suitable tool inserted within tube 137.

Preferably base 11 is provided with indicators 141, each of said indicators being rigidly fixed as by screws 143 to the exterior of base 11, closely adjacent the top of base 11, and respectively positioned so that one of each of the indicators is alined with the centers of passages 21 and guideway 25 so as to give a ready reference for the location of the passages or guideway which normally are concealed by turntable 29. Turntable 29 along its side and adjacent the lower edge thereof is provided with a plurality of reference lines 145, Fig. 1, one of such reference lines being provided for each of the stumps 34 and each of the die holes 29, and each reference line being respectively alined with the center of its related turntable part.

Turnably mounted in the upper end of cap 93 is a stub 147, which, at its upper end, is flattened as at 148. Hinged to stub 147, as by pin 149, is the yoke-like end 151 of a relatively elongated lever-like striking tool 153. Preferably striking tool 153 adjacent yoke 151 is chambered as at 155 (Fig. 4) to house a compression spring 156 bearing against the closed end of chamber 155 and oppositely against one end of a floating plunger 157. At its opposite end plunger 157 is formed with an expanded head which is flattened to seat against stub top 148. It will be seen that striking tool 153 may be swung about pin 149 freely and that it may be rotated with stub 147 so as to project in any desired direction from post 27. The spring mounting just described is particularly effective in permitting the moving of striking tool 153 to a substantially vertical non-use position, in which position spring 156 forces plunger 157 into seating engagement with the flat top 148 of stub 147, yieldingly resisting movement of striking tool 153 from a vertical to horizontal position. It will be seen that when striking tool 153 has been moved to a substantially horizontal position, such as that shown in Fig. 1, it may be rested upon a tool carried by one of the tool carrying arms and that a limited downward movement of striking tool 153 may be thereafter accomplished, this downward movement being limited by abutment of yoke 151 against the side of stub 147 to prevent over-travel of the striking tool.

In the use of the watch repair means of this invention the work piece selected from the time piece under repair may be positioned on the turntable 29 and if for example it is desired to employ one of the stumps 34 in connection with the repair work, the work piece will be positioned over the stump 34A selected. Turntable 29 may then be rotated until the reference line 145 of the selected stump is in register with indicator 141 of guideway 25. With the turntable thus positioned lock pin 57 is rotated by handle 58, moving eccentric end portion 59 into locking engagement with collar aperture 55, thus locking the turntable against rotational movement. The stump lift mechanism may then be operated with lower cam member 65 rotated by handle 67, effecting elevation of upper cam member 66, as heretofore described, the upper end 83 of cam member 66 engaging the lower end of stump 34A and elevating the stump to use position in which it projects above the upper face of turntable 29. The desired tool may then be moved into measured use position through the interaction of the barrel 101 and tube 103, striking tool 153 swung to overlie the head of portion 108 and thereafter limiting downward movement of the striking tool against the punch head effecting the desired tool movement. When pressure of striking tool 153 has been released, resiliently mounted support member 107 is effective to raise punch 108 out of engagement with the work piece therebelow.

In other instances it is desirable to employ die holes 39 in connection with a selected arm-carried tool, as for example, a punch carried by arm 97. Procedure similar to that described is undertaken with the reference line 145 of passage 21 underlying arm 97. As previously described, striking tool 153 is moved into use position overlying the tool carried by arm 97 and downward striking movement accomplished, effecting removal, for example, of an undesired or broken part. Such removed part is deposited by gravity in passageway 21 and drops therethrough to access opening 23, from which it may be conveniently removed.

In some instances it is further desirable to employ a removable, vise-like stump, such as the stumps 159, 160 illustrated in Figs. 9 and 10. Each of the stumps 159, 160 are provided with a lower externally threaded portion adapted for engagement by the internal threading of screw wheel 41 and its hub 42. Rigidly secured to and laterally extending from each of the stumps 159, 160 is a hook 161 having a downturned end portion 162. When either of the stumps 159, 160 is positioned in clamp aperture 45 for engagement by screw wheel 41 the end portion 162 is positioned in recess 46 (Fig. 3) with the portion of hook 161 intermediate end portion 162 and the stump member lying in groove 47. In this manner anti-rotational engagement of the stumps 159, 160 is effected and upon rotation of screw wheel 41 the engaged stump is drawn into clamp aperture 45 effecting closure, as desired, of the jaws 163 of the stump.

It is believed apparent that a device may be positioned in either of these vise-like stumps and clamped therein for retention during work thereon. When thus clamped the turntable may be rotated as before to position the stump-held work piece beneath a selected work tool.

In some instances it may be found desirable to shift the positioning of the respective arms relative to the underlying passages and guideway, as, for example, to position arm 98 overlying guideway 25 or otherwise. Under such circumstances screw cap 93 may be loosened, releasing head 89 for rotational movement and repositioning of the arms over the desired cooperative members, and when thus repositioned cap 93 may be readily again tightened effecting locking of the head and arms in their new positions.

I claim:

1. A device for use in the repair of mechanisms, which device includes a base having an annular trackway formed in its upper face; a horizontal turntable rotatably mounted on said base; a plurality of anvil-like members arranged in an arcuate band having a radius similar to the radius of said trackway supported by said turntable for vertical reciprocation relative to said turntable, said members depending below said turntable into said trackway; a vertical guideway formed in said base underlying and communicating with said trackway; cam means mounted in said guideway consisting of a rotatable lower cam member and a vertically slidable upper cam member resiliently coupled, said cam members having respectively upper and lower ends oppositely deeply serrated to form camming surfaces cooperative upon rotation of said lower cam member to raise said upper member, the upper end of said upper cam member lying substantially flush with the bottom of said trackway and upon raising being positioned substantially flush with the upper face of said base, said upper end of said upper cam member during raising abutting the lower end of one said anvil-like member positioned over said cam means and effecting elevation of said abutted anvil-like member; tool carrying means overlying said turntable; tools carried by said latter means above said turntable in vertical alinement with said trackway; and base carried means for locking said turntable against rotation relative to said base.

2. A device for use in the repair of mechanisms, which device includes a base having an annular trackway formed in its upper face; a horizontal turntable rotatably mounted on said base; a plurality of anvil-like members arranged in an arcuate band having a radius similar to the radius of said trackway supported by said turntable for vertical reciprocation relative to said turntable, said members depending below said turntable into said trackway; a vertical guideway formed in said base underlying and communicating with said trackway; cam means mounted in said guideway for effecting elevation of one of said anvil-like members; and base carried means for locking said turntable against rotation relative to said base.

3. A device for use in the repair of mechanisms, which device includes a base having an annular trackway formed in its upper face; a horizontal turntable rotatably mounted on said base; a plurality of anvil-like members arranged in an arcuate band having a radius similar to the radius of said trackway supported by said turntable for vertical reciprocation relative to said turntable, said members depending below said turntable into said trackway; a vertical guideway formed in said base underlying and communicating with said trackway; cam means mounted in said guideway for effecting elevation of one of said anvil-like members; tool carrying means overlying said turntable; tools carried by said latter means above said turntable in vertical alinement with said trackway; and base carried means for locking said turntable against rotation relative to said base.

4. A device for use in the repair of mechanisms, which device includes a base having an annular trackway formed in its upper face; a horizontal turntable rotatably mounted on said base; a plurality of anvil-like members arranged in an arcuate band having a radius similar to the radius of said trackway supported by said turntable for vertical reciprocation relative to said turntable, said members depending below said turntable into said trackway; a vertical guideway formed in said base underlying and communicating with said trackway; and cam means mounted in said guideway consisting of a rotatable lower cam member and a vertically slidable upper cam member resiliently coupled, said cam members having respectively upper and lower camming surfaces cooperative upon rotation of said lower cam member to raise said upper member, the upper end of said upper cam member being substantially flush with the bottom of said trackway and upon raising being positioned substantially flush with the upper face of said base, said upper end during raising abutting the lower end of one said anvil-like member positioned over said cam means and effecting elevation of said abutted anvil-like members.

5. In a device for use in the repair of mechanisms, which device includes a base having a central bore, a vertical post fixed in said bore and projecting above said base, and a horizontal turntable surrounding said post rotatably mounted on said base, means for locking said turntable against rotation relative to said base, which comprise a vertical collar interposed in said bore between said post and said turntable and extending below said turntable into said base, said collar being slidable relative to said post, an aperture in said collar below said turntable, a beveled opening in said turntable, an enlarged beveled portion complementary to said opening carried by said collar, a lock pin, including a barrel and a cylindrical end portion projecting from one end of said barrel out of axial alinement therewith, supported by said base for rotation about the longitudinal axis of said barrel with said end portion disposed within and eccentrically of said aperture and abutting the upper portion of the interior of said aperture, rotation of said pin barrel moving said end portion away from said abutment into engagement with a lower portion of the interior of said aperture to move said aperture and collar downwardly, said downward collar movement moving said enlarged collar portion into clamping engagement with the bevel of said turntable opening adjacent said post.

6. In a device for use in the repair of mechanisms, which device includes a base having a central bore, a vertical post, positioned in said bore, fixed to and projecting above said base, and a horizontal turntable rotatably mounted on said base, means for locking said turntable against rotation relative to said base, which comprise a collar surrounding and slidably fitting said post having a portion closely overlying said turntable adjacent said post, said collar being movable into engagement with said turntable, a lock pin, including a barrel and a cylindrical end portion projecting from one end of said barrel out of axial alinement therewith, supported by said base for rotation about the longitudinal axis of said barrel, and means coupling said collar to said end portion for limited vertical reciprocation of said collar relative to said post responsive to barrel rotation, downward movement of said collar moving said collar portion into clamping engagement with said turntable adjacent said post.

7. In means for repairing work pieces, which include a base for supporting a work piece, a central post extending vertically above said base, a plurality of horizontal tool supports fixed to and extending radially from said post, and a striking tool, means attaching said striking tool to said post above said tool supports comprising a vertical stub turnably mounted on said post above said tool supports, a yoke extending from one end of said striking tool, said yoke embracing said sub and being hinged thereto, a chamber formed in said striking tool adjacent to and communicating with said yoke, a floating plunger reciprocably mounted in said chamber and abutting said stub, and a spring urging said plunger toward stub abutment, said striking tool being shiftable about said hinged attachment to and from a non-use position in which said striking tool is positioned extending vertically above said post, the top said stub being flattened to provide a seat for said plunger into seating engagement to yieldingly restrain movement of said tool away from said non-use position.

8. Means for repairing work pieces, which include a base for supporting a work piece, a central post extending vertically above said base, a plurality of horizontal tool supports fixed to and extending radially from said post, a striking tool, and means attaching said striking tool to said post above said tool supports, said attaching means comprising a vertical stub turnably mounted on said post above said tool supports, a yoke extending from one end of said striking tool, said yoke embracing said stub and being hinged thereto, plunger means carried by said striking tool adjacent said yoke, and means urging said plunger means toward stub abutment, said striking tool being shiftable about said hinged attachment to and from a non-use position in which said striking tool is positioned extending vertically above said post, the top of said stub being flattened to provide a seat for said plunger means in said non-use position, said plunger seating on said flattened stub top under said urging and yieldingly restraining movement of said tool away from said non-use position.

9. A device for use in the repair of mechanisms, which device includes a base having an annular trackway formed in its upper face; a horizontal turntable rotatably mounted on said base; a plurality of anvil-like members arranged in an arcuate band having a radius similar to the radius of said trackway supported by said turntable for vertical reciprocation relative to said turntable, said members depending below said turntable into said trackway; a vertical guideway formed in said base underlying and communicating with said trackway; and cam means mounted in said guideway for effecting elevation of one of said anvil-like members.

GEORGE O. MARTIN.

REFERENCES CITED

The following references are of record in the file of this patent:

UNITED STATES PATENTS

| Number | Name | Date |
|---|---|---|
| 403,849 | Martel | May 21, 1889 |
| 892,309 | Russell | June 30, 1908 |
| 994,229 | Winkler | June 6, 1911 |
| 1,045,487 | Williams et al. | Nov. 26, 1912 |
| 1,236,849 | Lesser | Aug. 14, 1917 |
| 1,345,703 | Schneider | July 6, 1920 |
| 1,415,235 | Garnett | May 9, 1922 |
| 2,238,580 | Campbell | Apr. 15, 1941 |
| 2,386,370 | Vaughan | Oct. 9, 1945 |

FOREIGN PATENTS

| Number | Country | Date |
|---|---|---|
| 49,302 | Switzerland | Nov. 27, 1909 |
| 246,062 | Germany | Apr. 27, 1912 |